(12) United States Patent
Vilcinskas et al.

(10) Patent No.: US 9,695,685 B2
(45) Date of Patent: Jul. 4, 2017

(54) SYSTEMS AND METHODS FOR DETECTING AND COMMUNICATING FAILURE OF INTEGRAL SURGE SUPPRESSION IN DRIVE SYSTEMS FOR DOWNHOLE EQUIPMENT

(71) Applicant: Baker Hughes Incorporated, Houston, TX (US)

(72) Inventors: Ernesto A. Vilcinskas, Tulsa, OK (US); Stephen Cunningham, Denver, CO (US); David McMahon, Foxfield, CO (US); Ryan Dodson, Broken Arrow, OK (US); Brian Haapanen, Broken Arrow, OK (US); Michael C. Underwood, Owasso, OK (US)

(73) Assignee: Baker Hughes Incorporated, Houston, TX (US)

( * ) Notice: Subject to any disclaimer, the term of this patent is extended or adjusted under 35 U.S.C. 154(b) by 169 days.

(21) Appl. No.: 14/066,481

(22) Filed: Oct. 29, 2013

(65) Prior Publication Data

US 2014/0139349 A1    May 22, 2014

Related U.S. Application Data (60) Provisional application No. 61/728,154, filed on Nov. 19, 2012.

(51) Int. Cl.
*E21B 47/00* (2012.01)
*H02H 9/04* (2006.01)

(52) U.S. Cl.
CPC ......... *E21B 47/0007* (2013.01); *H02H 9/042* (2013.01)

(58) Field of Classification Search
CPC  H02H 9/04; H02H 9/042–9/044; H02H 3/04; H04L 12/10; E21B 47/0007
See application file for complete search history.

(56) References Cited

U.S. PATENT DOCUMENTS

| | | | | |
|---|---|---|---|---|
| 4,089,032 A | * | 5/1978 | Dell Orfano | 361/56 |
| 4,259,705 A | * | 3/1981 | Stifter | 361/56 |
| 4,587,588 A | * | 5/1986 | Goldstein | 361/54 |
| 4,739,436 A | * | 4/1988 | Stefani et al. | 361/56 |
| 4,740,859 A | * | 4/1988 | Little | 361/56 |
| 4,807,083 A | * | 2/1989 | Austin | 361/111 |
| 4,901,183 A | * | 2/1990 | Lee | 361/56 |
| 4,903,161 A | * | 2/1990 | Huber et al. | 361/56 |

(Continued)

*Primary Examiner* — Orlando Bousono
(74) *Attorney, Agent, or Firm* — Law Offices of Mark L. Berrier (57) ABSTRACT

Systems and methods for providing notifications to monitoring systems that are remotely located from a well upon failure of a surge suppressor in a drive system for equipment used in the operation of the well. In one embodiment, an ESP system is installed in a well. A VSD having a surge suppressor is coupled between a power source and the ESP system. The surge suppressor is monitored to detect a failure of its surge suppression capabilities. In response to detecting a failure, a notification is provided to a monitoring system that is located remotely from the well. The notifications may be provided via phone call, email, text message or other means. The surge suppressor may also provide a local indication of the failure. The VSD may be configured to continue operation despite the failure of the surge suppression capability.

17 Claims, 5 Drawing Sheets

(56) References Cited

U.S. PATENT DOCUMENTS

| | | | |
|---|---|---|---|
| 5,153,806 A * | 10/1992 | Corey | 361/56 |
| 5,537,044 A * | 7/1996 | Stahl | 324/511 |
| 5,555,150 A * | 9/1996 | Newman, Jr. | 361/56 |
| 5,698,846 A * | 12/1997 | Funke | 250/222.2 |
| 5,790,360 A * | 8/1998 | Ryan | 361/111 |
| 5,978,198 A * | 11/1999 | Packard et al. | 361/111 |
| 6,069,781 A * | 5/2000 | Wingate et al. | 361/111 |
| 6,118,639 A * | 9/2000 | Goldstein | 361/55 |
| 6,282,073 B1 * | 8/2001 | Glaser et al. | 361/104 |
| 6,384,583 B1 | 5/2002 | Lestician | |
| 6,535,369 B1 * | 3/2003 | Redding et al. | 361/111 |
| 6,556,394 B1 * | 4/2003 | Wilson | 361/42 |
| 6,633,476 B1 | 10/2003 | Allina | |
| 6,876,533 B1 * | 4/2005 | Ryan | 361/104 |
| 7,209,048 B1 | 4/2007 | Pace | |
| 7,686,074 B2 | 3/2010 | McCoy | |
| 7,938,679 B2 | 5/2011 | Wadsworth | |
| 8,310,800 B1 * | 11/2012 | Williams | 361/131 |
| 2001/0022716 A1 * | 9/2001 | Glaser et al. | 361/117 |
| 2002/0024326 A1 * | 2/2002 | Lestician | 323/276 |
| 2002/0048131 A1 * | 4/2002 | Jakwani et al. | 361/118 |
| 2002/0048132 A1 * | 4/2002 | Jakwani et al. | 361/118 |
| 2003/0121656 A1 * | 7/2003 | Hershberger | 166/250.03 |
| 2006/0120005 A1 * | 6/2006 | Van Sickle | 361/118 |
| 2007/0086141 A1 * | 4/2007 | Elms | 361/118 |
| 2007/0188962 A1 * | 8/2007 | Baldwin | 361/118 |
| 2008/0037188 A1 * | 2/2008 | Wilson et al. | 361/56 |
| 2008/0080116 A1 * | 4/2008 | Qin et al. | 361/119 |
| 2008/0196887 A1 * | 8/2008 | McCoy et al. | 166/250.01 |
| 2009/0293523 A1 * | 12/2009 | Bittner et al. | 62/236 |
| 2010/0265626 A1 * | 10/2010 | Qin et al. | 361/119 |
| 2010/0284826 A1 * | 11/2010 | Reid et al. | 417/53 |
| 2011/0088484 A1 * | 4/2011 | Camilleri | 73/861.42 |
| 2011/0125451 A1 * | 5/2011 | Cheifetz et al. | 702/130 |
| 2011/0250084 A1 * | 10/2011 | Marica | 417/540 |
| 2012/0154971 A1 * | 6/2012 | Brashear | 361/118 |
| 2014/0118158 A1 * | 5/2014 | Parra et al. | 340/854.9 |
| 2014/0126092 A1 * | 5/2014 | Alexander | 361/56 |

* cited by examiner

SYSTEMS AND METHODS FOR DETECTING AND COMMUNICATING FAILURE OF INTEGRAL SURGE SUPPRESSION IN DRIVE SYSTEMS FOR DOWNHOLE EQUIPMENT

CROSS-REFERENCE TO RELATED APPLICATIONS

This application claims the benefit of U.S. Provisional Patent Application 61/728,154, filed Nov. 19, 2013, which is incorporated by reference as if set forth herein in its entirety.

BACKGROUND

Field of the Invention

The invention relates generally to electrical surge suppression systems, and more particularly to systems and methods for monitoring and providing remote notification of failures of surge suppression capabilities in drive systems for downhole equipment such as electric submersible pumps (ESPs).

Related Art

Oil and natural gas are often produced by drilling wells into oil reservoirs and then pumping the oil and gas out of the reservoirs through the wells. Often, the oil is pumped out of the wells using ESPs. Electrical power is provided from an electrical grid to electrical drive systems at the surface of the wells, and these drive systems provide electrical power at the appropriate voltages and frequencies to the ESPs to allow them to pump fluid from the wells. Variable speed drives (VSDs) are commonly used to drive ESPs. Because VSDs provide advantages such as improved energy usage, improved process control, increased production and increased reliability with respect to competing technologies, the use of these drives has increased substantially in recent years.

There may be a number of VSDs that are connected to the same power grid. Because a variable speed drive is a non-linear load, each VSD may draw current from the power grid in a non-linear fashion. There may also be other non-linear loads connected to the power grid. This non-linear loading of the power grid may cause the grid to experience distortion or disruptions as it provides power to the VSDs. In addition, power distortions may originate from other sources—either man-made or natural. The distortion or disruptions may result in electrical surges that can damage the VSDs or the equipment that is driven by the VSDs. Consequently, some VSDs incorporate integral surge suppressors that mitigate surges in the power provided by the electrical grid from propagating to or through the VSDs and damaging the VSDs or other equipment.

Normally, a surge suppressor is designed to prevent a single damaging surge of power. Typically, after a surge suppressor has experienced a power surge and prevented the surge from damaging the VSD, it is no longer capable of preventing further surges from damaging the VSD or other equipment. Often, upon inspection of a VSD, a field service technician, engineer or other operator of the well will find that the surge suppressor has "done its job" and is no longer working. Frequently, there is no external indication that the surge suppression capability has been compromised and the drive is consequently at higher risk than it was before failure of the surge suppressor. Failure of the surge suppressor may also provide a more general indication that there are power anomalies on that line or system. ("Failure" is used here to indicate that the surge suppressor is no longer capable of suppressing a power surge, rather than that the surge suppressor was defective or did not initially function to suppress a power surge.)

Since the operators of the well may not be aware of the surge suppressor failure until someone physically inspects the drive system, the drive may continue to operate without surge protection for a significant amount of time. During this time, there is an increased risk of damage to the drive and/or downhole equipment, and a resulting increased risk of costly interruptions of well operations for repairs. It would therefore be desirable to provide systems and methods for providing notifications to well operators or others upon failure of a surge suppressor in a drive system for downhole equipment in order to allow timely remedial actions, such as repair or replacement of the surge suppressor.

SUMMARY OF THE INVENTION

This disclosure is directed to systems and methods for providing notifications to well operators or others who are remotely located from a well upon failure of a surge suppressor in a drive system for equipment used in the operation of the well. In one embodiment, an ESP system is positioned downhole in the well. A VSD at the surface of the well is coupled to the ESP system. The VSD receives power from an electric utility grid or other power source and converts the received power to a form that is suitable to drive the ESP.

The VSD is coupled to the power grid, and the surge suppressor is connected in parallel. The surge suppressor is configured such that the energy from electrical spikes, surges or other disturbances in the received power that could be harmful to the VSD and/or the ESP system are shunted to ground—away from the equipment to be protected. The surge suppressor is configured to provide one or more notifications upon occurrence of a power disturbance that causes the surge suppressor to no longer function. These notifications are provided to well operators, monitors, applications, or others who are located remotely from the well. The notifications may be provided via phone call, email, text message or other means. The surge suppressor may also provide an indicator local to the surge suppressor (e.g., at the VSD) which provides a visual, audible or other indication to a person located at the VSD as to the failed state of the surge suppressor.

One embodiment comprises a surge suppressor failure notification system. In this system, notifications indicating failure of a surge suppressor in equipment used in the operation of a well are provided to a monitoring station that is remote from the well. The system includes downhole equipment system which is installed in the well. An electric drive system (e.g., a VSD) is coupled between the downhole equipment system and a power source, and is configured to provide power suitable to drive the downhole equipment system. A surge suppressor is coupled to the drive system to suppress disturbances in the power provided from the power source. A monitor is coupled to the surge suppressor to determine when the surge suppression capability of the surge suppressor has failed. A communication system is coupled to the monitor so that, when the monitor determines that the surge suppressor has failed, the monitor communicates a notification of the failure to a monitoring station that is remotely located from the well. Consequently, it is not necessary for a well operator (e.g., an engineer or technician) to be present at the well to determine whether the surge suppressor is still functioning properly. The system may include a local failure indicator (e.g., a light or other visual or audible indicator) which is coupled to the surge suppressor and operates in parallel with the remote notification to provide indicate a failure to a well operator at the well site. The surge suppressor may be coupled to the power source in parallel to the drive system and configured to shunt power disturbances from the power source to ground n order to reduce the impact of the disturbances on the drive system. The drive system may be configured to continue to operating and providing power to the downhole equipment even after failure of the surge suppressor. Similar systems may be installed in drive systems for several different wells, with notifications of surge suppressor failures for all of the different drives being communicated to a single monitoring station.

Another embodiment comprises an electric drive system (e.g., a variable speed drive, or VSD) for use with downhole equipment. The drive system includes a converter section that converts AC power from a power source to DC power, a capacitor bank that stores the DC power produced by the converter section, and an inverter section that converts DC power from the capacitor bank to AC power suitable to drive the downhole equipment. The system has a surge suppressor that may be configured to shunt power disturbances from the power source to ground to protect the drive system. The system includes a monitor coupled to the surge suppressor. A communication system is coupled to the monitor. The monitor determines whether the surge suppressor has failed and, in response to determining that the surge suppressor has failed, the monitor outputs a notification of the failure. The communication system may be configured to transmit the notification wirelessly or through any suitable communication channels. The drive system may have a local failure indicator that provides an indication of the failure of the surge suppressor. The drive system may be configured to continue to outputting AC power after failure of the surge suppressor.

Another alternative embodiment comprises a method for providing notification indicating failure of a surge suppressor in well equipment to locations remote from the well. The method includes installing a downhole equipment system in a well and coupling an electric drive system between the downhole equipment system and a power source. A surge suppressor is coupled to the electric drive system to suppress power disturbances (e.g., by shunting power disturbances from the power source to ground). The surge suppression capability of the surge suppressor is then monitored and it is determined whether the surge suppression capability of the surge suppressor has failed. In response to determining that the surge suppression capability has failed, a notification of the failure is communicated to a monitoring station that is remotely located from the well. The method may also include providing a local indication of the failure at a site of the well. The drive system may continue to provide power to the downhole equipment after failure of the surge suppressor. The method may include monitoring surge suppression capabilities of multiple surge suppressors installed in multiple drive systems at different wells, where in response to determining that the surge suppression capability of any of the surge suppressors has failed, a notification of the failure is communicated to a common monitoring station.

Numerous other embodiments are also possible.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as would be understood by persons skilled in the art of the invention.

DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for providing notifications to well operators or others upon failure of a surge suppressor in a drive system (e.g., a VSD) for downhole equipment (e.g., an ESP) in order to allow timely remedial actions, such as repair or replacement of the surge suppressor.

Figure 1:
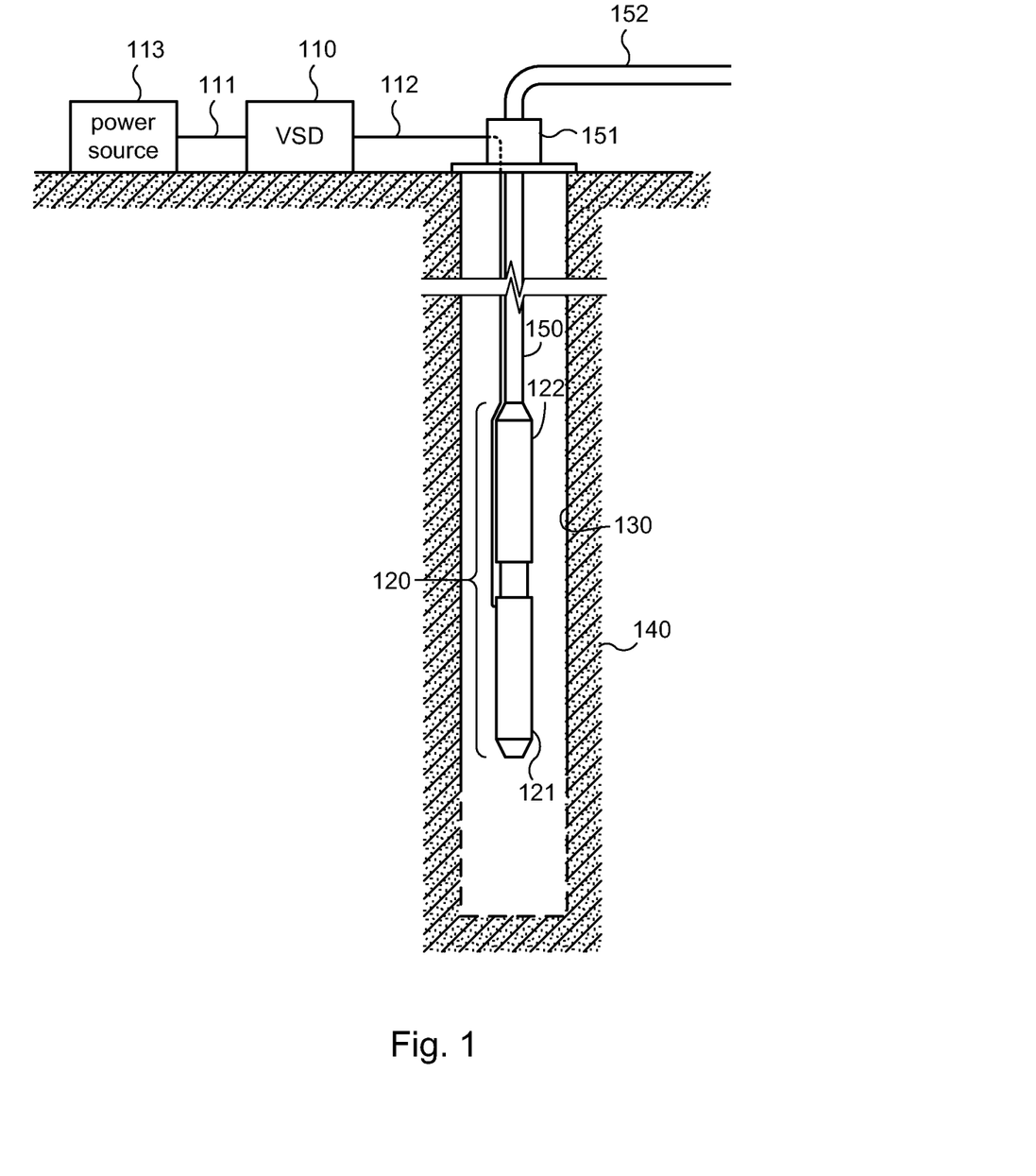
FIG. 1 is a diagram illustrating a pump system in which the present invention can be implemented.

Referring to FIG. 1, a diagram illustrating a typical pump system is shown. A wellbore 130 is drilled into an oil-bearing geological structure 140, and is cased. The casing within wellbore 130 is perforated at the lower end of the well to allow oil to flow from the formation into the well. Electric submersible pump 120 is coupled to the end of tubing string 150, and the pump and tubing string are lowered into the wellbore to position the pump in producing portion of the well (i.e., the perforated portion). A variable speed drive 110 which is positioned at the surface is coupled to pump 120 by drive output line 112, which runs down the wellbore along tubing string 150, which may be thousands of feet long.

Pump 120 includes an electric motor section 121 and a pump section 122. (Pump 120 may include various other components which will not be described in detail here because they are well known in the art and are not important to a discussion of the invention.) Motor section 121 is operated to drive pump section 122, which actually pumps the oil through the tubing string and out of the well. In this embodiment, motor section 121 uses an induction motor which is driven by variable speed drive 110. Variable speed drive 110 receives AC (alternating current) input power from an external source 113 such as a power grid via input line 111. Drive 110 rectifies the AC input power and then produces output power that is suitable to drive motor section 121 of pump 120. This output power is provided to motor section 121 via drive output line 112.

Variable speed drive 110 generates a three-phase output waveform that is used to drive motor section 121 of pump 120. The phase sequence of the output waveform is intended to drive the motor and thereby the pump 120 in a forward direction. The phase sequence of the output signal can be reversed to drive the pump in the opposite direction as well, and is configured to automatically start the pump in the forward direction, as will be discussed in more detail below. The frequency of the drive output waveform can be varied to adjust the speed of the pump motor. When the variable speed drive 110 is properly connected to motor section 121, variable speed drive 110 causes pump 120 to pump oil from the producing portion of the well, through tubing string 150 to well head 151. The oil then flows out through production flow line 152 and into storage tanks (not shown in the figure.)

Figure 2:
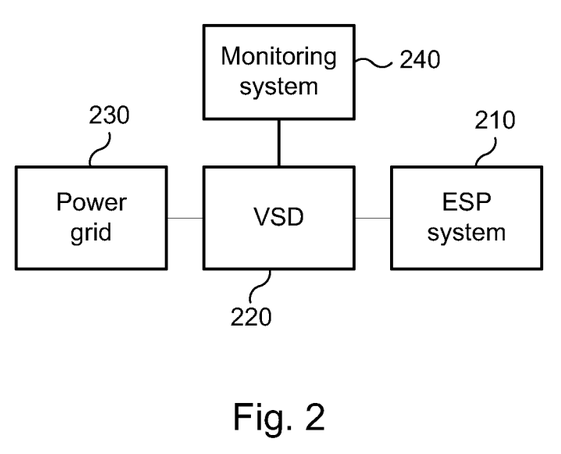
FIG. 2 is a functional block diagram illustrating the general structure of a VSD system including a variable speed drive and pump in accordance with one embodiment.

Referring to FIG. 2, a functional block diagram illustrating the general structure of a VSD system according to one embodiment is shown. In this embodiment, an ESP system 210 is coupled to a VSD 220 so that the VSD can drive the ESP. VSD 220 is coupled to a power grid 230 through a surge suppressor (not depicted in the figure). Power disturbances such as spikes or surges that occur in the power provided by power grid 230 to VSD 220 are filtered or otherwise suppressed by the surge suppressor so that they do not damage the VSD. Some of the power disturbances may be sufficiently large that they cause the surge suppressor to fail. In other words, the surge suppressor may no longer be capable of protecting the VSD by suppressing subsequent disturbances.

When the surge suppression capability of this component fails, the surge suppressor triggers a notification to a monitoring system 240. In one embodiment, monitoring system 240 may be a real-time monitoring system such as the Vision™ family of artificial lift monitoring and optimization systems provided by Baker Hughes Corporation. Monitoring system 240 may be coupled to VSD 220 via wired or wireless communication channels so that it can communicate bidirectionally with VSD 220. In other embodiments, monitoring system 240 may consist of a simpler automated system or a device that is capable of receiving notifications of a type transmitted by VSD 220.

Figure 3:
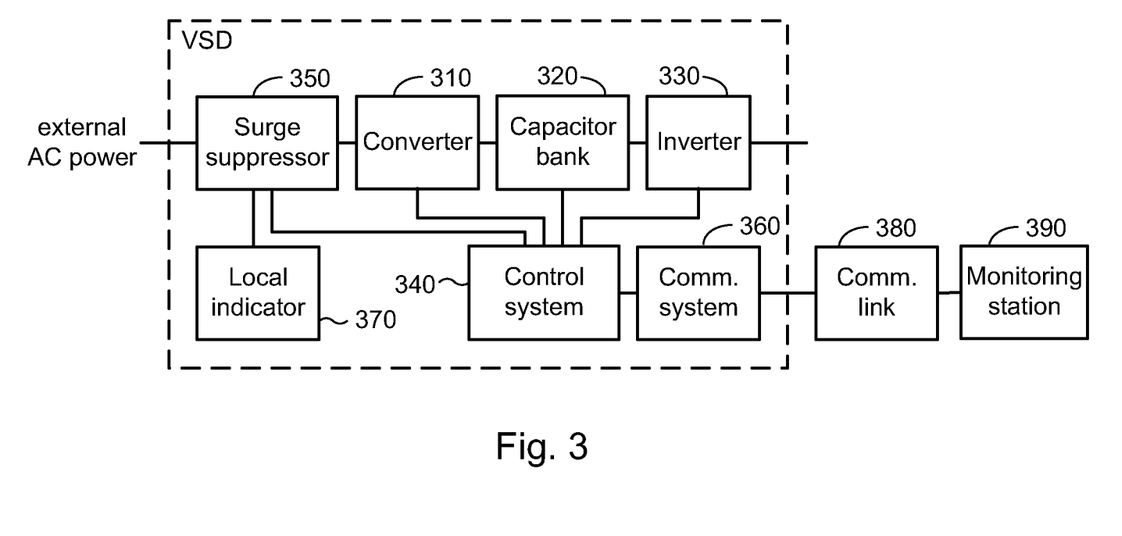
FIG. 3 is a functional block diagram illustrating the structure of a VSD having surge suppression and notification capabilities according to one embodiment.

Referring to FIG. 3, a functional block diagram illustrating the structure of a VSD having surge suppression and notification capabilities according to one embodiment is shown. In this embodiment, the VSD includes a converter section 310, a capacitor bank 320 and an inverter section 330. Converter section 310 rectifies the AC power received from a power grid or other external power source while the surge suppressor operates in parallel. Failure or destruction of the surge suppressor does not prevent continued drive operation 350. Converter section 310 generates DC power which is passed through an LC filter and charges a capacitor bank 320 to a desired voltage. The desired voltage is achieved by controlling the operation of converter section 310. The voltage on capacitor bank 320 is then used to drive inverter section 330. The purpose of inverter section 330 is to generate a three-phase output voltage to drive an ESP system. The power output by the VSD may have one of a variety of waveforms, as appropriate for the ESP system.

The components of the VSD are coupled to a control module 340, which controls the various components. For example, control module 340 determines the timing of the SCRs in to control the voltage of the capacitor bank, and further controls the operation of inverter section 330 to select a desired output mode and adjust the output voltage of the VSD. Control module 340 also monitors surge suppressor 350 to determine the status of the surge suppressor. In particular, control module 340 monitors information provided by surge suppressor 350 which indicates whether or not the surge suppression capabilities of this component have been compromised. For example, if surge suppressor 350 suppresses a power surge from the power grid and is not capable of suppressing a subsequent power surge, it may provide active or passive indications to control module 340 that its surge suppression capabilities have failed.

In response to detecting the failure of the surge suppression capabilities of surge suppressor 350, control module 340 is configured to cause communication system 360 to transmit a notification of the failure via communication link 380 to a remotely located monitoring station 390. Communication system 360 may cause the notification to be communicated by any suitable means. If monitoring station 390 is dedicated to performing real-time monitoring of the well operations in which the VSD is used, the notification may be communicated, for instance, as a formatted data transmission. The notification may be communicated separately, or with other well operations data. The surge suppressor failure notification may also be communicated to devices that are not dedicated to monitoring the well's operations. For example, communication system 360 may transmit text messages or telephone messages to a cell phone in order to notify a well technician, engineer or other interested person that the surge suppression capabilities of the VSD have failed. The failure notification could also be transmitted to interested persons via email.

Communication link 380 may be any type of communication channel that is suitable to transmit the notification. For instance, communication link 380 may be a dedicated line that connects the VSD to monitoring station 390. Communication link 380 could alternatively be a network that couples the VSD and monitoring station 390 to one or more other devices. Monitoring station 390 could, for example, be coupled to multiple wells or devices to enable monitoring of all of these devices. Communication link 380 could alternatively use a telephone network to communicate notifications from communication system 360 to monitoring station 390. Communication link 380 may be wired, wireless, or a combination of the two.

It should be noted that monitoring station 390 is remotely located from the VSD. In other words, the monitoring station is not located at the same site as the VSD. Typically, monitoring station 390 will be located miles from the well. As noted above, Monitoring station 390 may be coupled to equipment at multiple wells that are themselves at separate locations. This allows the monitoring station to monitor the surge suppression status of the VSDs without the need to have a technician or other person physically present at the site of the VSDs.

While the VSD is configured to communicate a failure notification to a remotely located monitoring station, it is also configured to provide a local indicator of the failed surge suppression capabilities of surge suppressor 350. In the embodiment of FIG. 3, a local indicator 370 provides an indication of the surge suppression capabilities. Local indicator may, for instance, be a visual indicator such as an LED, LCD or lamp that indicates whether the surge suppressor has failed. In this example, local indicator 370 is coupled directly to surge suppressor 350, but it could alternatively be coupled to control module 340. Similarly, the functions of various ones of the components of the VSD could be moved to other ones of the components.

Figure 4:
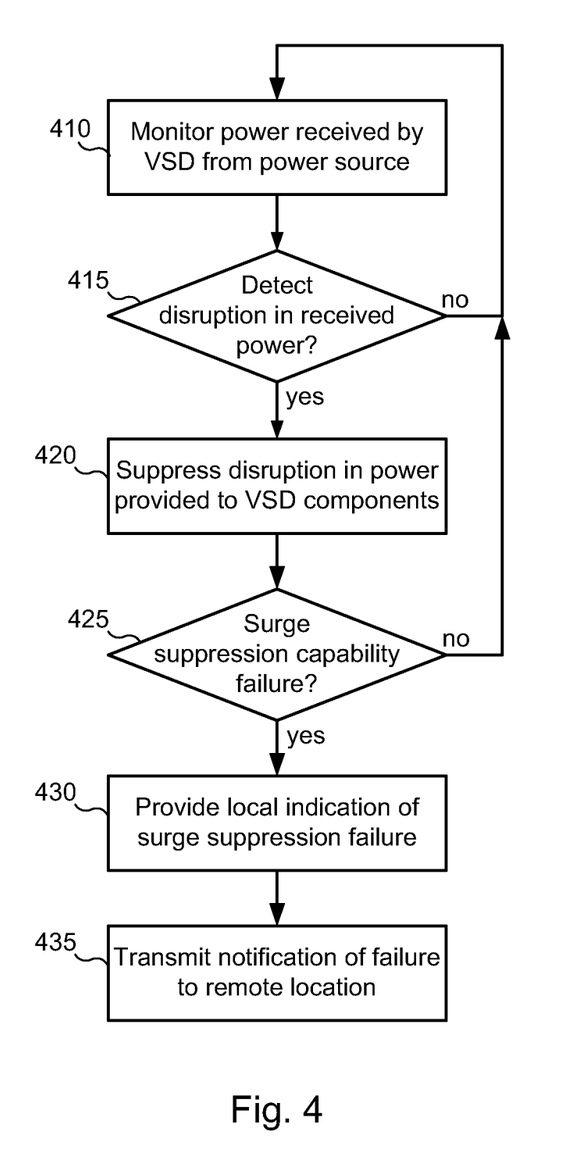
FIG. 4 is a flow diagram illustrating a method for providing a notification indicative of a surge suppressor failure in accordance with one embodiment.

Referring to FIG. 4, a method for providing a notification indicative of a surge suppressor failure in accordance with one embodiment is shown. In this embodiment, the power received from a power source such as a power grid is monitored by a surge suppressor of a VSD (410). When the surge suppressor detects a disruption in the received power (415), the surge suppressor suppresses the disruption in an appropriate manner to prevent the disruption from propagating to the other VSD components and damaging these components (420). The surge suppressor may do this in a passive manner, such as by filtering out spikes or surges in the power. The surge suppressor is configured to determine whether the surge suppression capability of the device has failed (425). This may also be performed in a substantially passive manner, such as by providing a fuse which, when blown, indicates failure of the surge suppression capability. If the surge suppression capability has failed, the surge suppressor is configured to provide a local indication of the failure (430), such as illuminating an LED at the VSD. The surge suppressor also transmits a notification to a remotely located device (435), such as a central monitoring station, personal computer, cell phone, etc. The notification may consist of an email, text message, phone call or any other suitable type of notification.

Figure 5:
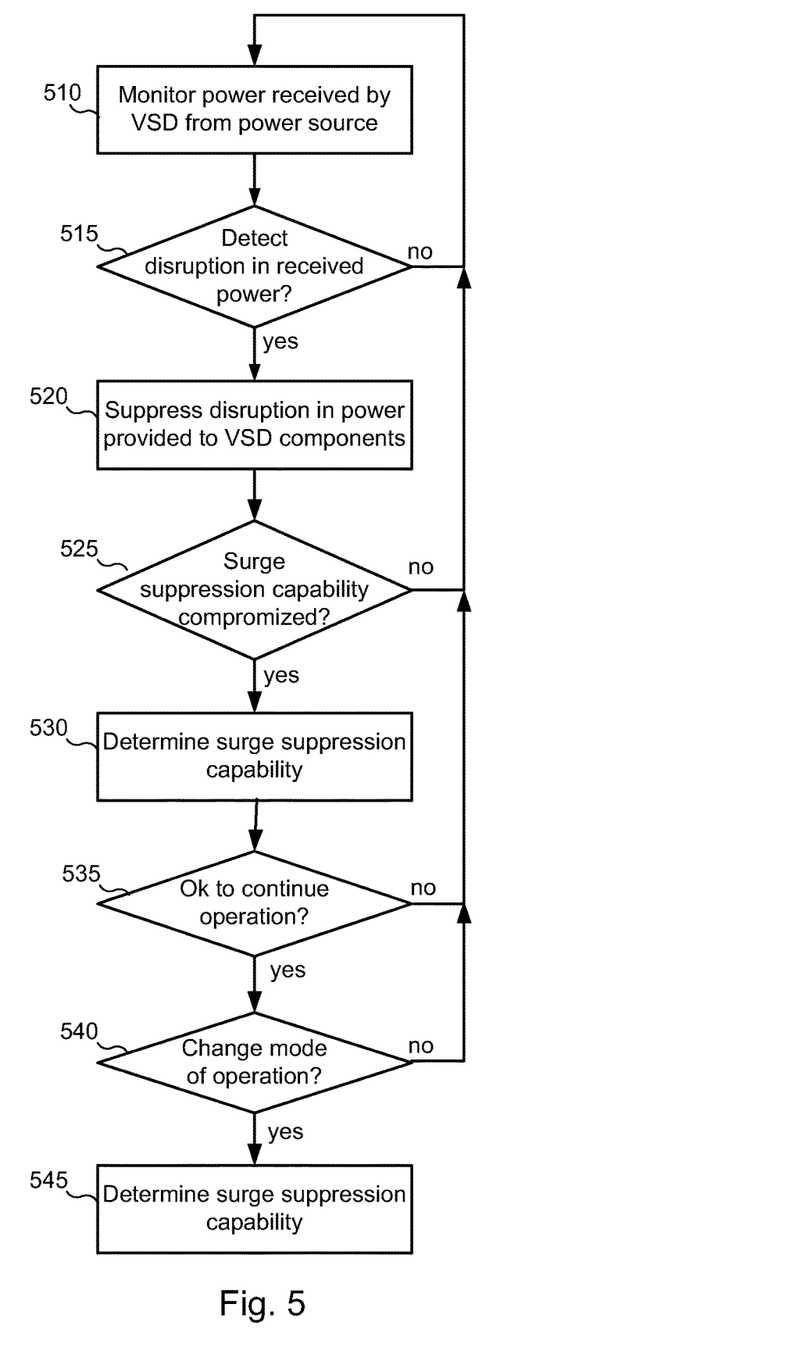
FIG. 5 is a flow diagram illustrating an alternative method for providing a notification indicative of a surge suppressor failure in accordance with one embodiment.

Referring to FIG. 5, an alternative method for providing a notification indicative of a surge suppressor failure in accordance with one embodiment is shown. In this embodiment, the power received from a power source is monitored by the surge suppressor of a VSD (510), and a disruption in the power received by the VSD is detected (515). The surge suppressor suppresses the disruption (520) to prevent damage to the VSD, and then determines whether the surge suppression capabilities of the surge suppressor have been compromised (525). If the surge suppression capabilities have not been compromised, the VSD continues to operate, with the surge suppressor monitoring the input power (510). If the surge suppression capabilities have been compromised, the remaining surge suppression capability may be determined (530). If the surge suppression capability of the device is sufficient to continue operation (535), or if the VSD is configured to continue operation regardless of the surge suppression capabilities, the VSD continues to operate, and the surge suppressor continues to monitor the input power (510). Otherwise, the system may be configured to determine whether the VSD should operate in a different mode (540). If no mode change is can be made, the system is shut down. If it is determined that the mode should be changed, this change is made (545), and operation is continued.

Those of skill will appreciate that the various illustrative logical blocks, modules, circuits, and algorithm steps described in connection with the embodiments disclosed herein may be implemented as electronic hardware, computer software (including firmware,) or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The steps of the methods described in connection with the embodiments disclosed herein may be embodied directly in hardware, in software (program instructions) executed by a processor, or in a combination of the two. Software may reside in RAM memory, flash memory, ROM memory, EPROM memory, EEPROM memory, registers, hard disk, a removable disk, a CD-ROM, or any other form of storage medium known in the art. Such a storage medium containing program instructions that embody one of the present methods is itself an alternative embodiment of the invention. One exemplary storage medium may be coupled to a processor, such that the processor can read information from, and write information to, the storage medium. In the alternative, the storage medium may be integral to the processor. The processor and the storage medium may reside, for example, in an ASIC.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the particular embodiment.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A surge suppressor failure notification system for providing notification to locations remote from a well indicating failure of a surge suppressor in equipment used in the operation of the well, the system comprising:
    an electric submersible pump (ESP) installed in a well;
    an electric drive system coupled between the ESP and a power source and configured to provide power to the ESP;
    a surge suppressor coupled to the electric drive system and configured to suppress disturbances in power provided from the power source to the electric drive system;
    a monitor coupled to the surge suppressor; and
    a communication system coupled to the monitor;
    wherein the monitor is configured to determine whether a surge suppression capability of the surge suppressor has failed; and
    wherein in response to determining that the surge suppression capability of the surge suppressor has failed, the monitor communicates a notification of the failure of the surge suppression capability to a monitoring station that is remotely located from the well, wherein the electric drive system is configured to, in response to failure of the surge suppression capability of the surge suppressor, make a determination of a desired output mode of the electric drive system and either switch to the desired output mode from a current output mode or continue to provide power to the ESP in the desired output mode.

2. The system of claim 1, further comprising a local failure indicator coupled to the surge suppressor, wherein in response to failure of the surge suppression capability of the surge suppressor, the local failure indicator provides an indication of the failure at a site of the well.

3. The system of claim 1, wherein the surge suppressor is coupled to the power source in parallel to the electric drive system, and wherein the surge suppressor is configured to shunt power disturbances from the power source to ground, thereby reducing an impact of the power disturbances on the electric drive system.

4. The system of claim 1, wherein the system includes a plurality of ESP's installed in a plurality of wells, wherein each of the ESP's includes a surge suppressor failure notification system as recited in claim 1, and wherein each of the surge suppressor failure notification systems is configured to provide notifications of surge suppressor failures to a common monitoring station.

5. The system of claim 1, wherein the electric drive system comprises a variable speed drive (VSD), and wherein the monitor is implemented in a control module of the VSD.

6. The system of claim 1, wherein the communication system includes one or more wireless communication links.

7. The system of claim 5, wherein the VSD comprises: a converter section configured to convert AC power from a power source to DC power; a capacitor bank configured to store DC power received from the converter section; an inverter section configured to convert DC power received from the capacitor bank to AC power; wherein the VSD includes the surge suppressor, the monitor, and the communication system.

8. An electric drive system for use with downhole equipment, the electric drive system comprising:
   an electric submersible pump (ESP) installed in a well;
   a converter section configured to convert AC power from a power source to DC power;
   a capacitor bank configured to store DC power received from the converter section;
   an inverter section configured to convert DC power received from the capacitor bank to AC power;
   a surge suppressor configured to suppress disturbances in the AC power provided from the power source to the converter section;
   a monitor coupled to the surge suppressor; and
   a communication system coupled to the monitor;
   wherein the monitor is configured to determine whether a surge suppression capability of the surge suppressor has failed;
   wherein in response to determining that the surge suppression capability of the surge suppressor has failed, the monitor outputs a notification of the failure of the surge suppression capability; and
   wherein the electric drive system is configured to, in response to failure of the surge suppression capability of the surge suppressor, make a determination of a desired output mode of the electric drive system and either switch to the desired output mode from a current output mode or continue to provide power to the ESP in the desired output mode.

9. The electric drive system of claim 8, further comprising a local failure indicator coupled to the surge suppressor, wherein in response to failure of the surge suppression capability of the surge suppressor, the local failure indicator provides an indication of the failure of the surge suppression capability.

10. The electric drive system of claim 8, wherein the surge suppressor is configured to shunt power disturbances from the power source to ground, thereby reducing an impact of the power disturbances on the electric drive system.

11. The electric drive system of claim 8, wherein the electric drive system comprises a variable speed drive (VSD), and wherein the monitor is implemented in a control module of the VSD.

12. The electric drive system of claim 8, wherein the communication system is configured to transmit the notification wirelessly.

13. A method for providing notification to locations remote from a well indicating failure of a surge suppressor in equipment used in the operation of the well, the system comprising:
   installing an electric submersible PUMP (ESP) in a well and coupling an electric drive system between the ESP and a power source, wherein a surge suppressor is coupled to the electric drive system and is configured to suppress disturbances in power provided from the power source to the electric drive system;
   monitoring a surge suppression capability of the surge suppressor;
   determining whether a surge suppression capability of the surge suppressor has failed; and
   in response to determining that the surge suppression capability of the surge suppressor has failed, communicating a notification of the failure of the surge suppression capability to a monitoring station that is remotely located from the well, and, in response to failure of the surge suppression capability of the surge suppressor, making a determination of a desired output mode of the electric drive system and either switching to the desired output mode from a current output mode or continuing to provide power to the ESP in the desired output mode.

14. The method of claim 13, in response to determining that the surge suppression capability of the surge suppressor has failed, providing a local indication of the failure at a site of the well.

15. The method of claim 13, continuing to provide power to the ESP after failure of the surge suppression capability of the surge suppressor.

16. The method of claim 13, the surge suppressor shunting power disturbances from the power source to ground, thereby reducing an impact of the power disturbances on the electric drive system.

17. The method of claim 13, further comprising monitoring surge suppression capability of surge suppressors installed in electric drive systems that provide power to ESP's in a plurality of wells, wherein in response to determining that the surge suppression capability of any of the surge suppressors has failed, communicating a notification of the failure of the surge suppression capability to a common monitoring station.

* * * * *